United States Patent [19]

Tanaka et al.

[11] Patent Number: 5,237,022
[45] Date of Patent: Aug. 17, 1993

[54] PROCESS FOR PREPARING POLYPHENYLENE SULFIDE RESINS

[75] Inventors: Shinji Tanaka; Hiroshi Inoue, both of Mie, Japan

[73] Assignee: Tosoh Corporation, Yamaguchi, Japan

[21] Appl. No.: 883,274

[22] Filed: May 14, 1992

[30] Foreign Application Priority Data

May 16, 1991 [JP] Japan .................. 3-139535

[51] Int. Cl.$^5$ .................. C08G 75/14; C08L 81/04
[52] U.S. Cl. .................. 525/537; 528/388
[58] Field of Search .................. 528/388; 525/537

[56] References Cited

U.S. PATENT DOCUMENTS

| | | | |
|---|---|---|---|
| 3,524,835 | 8/1970 | Edmonds, Jr. et al. | 528/388 |
| 3,562,199 | 2/1971 | Hill, Jr. et al. | 528/388 |
| 3,717,620 | 2/1973 | Rohlfing | 525/537 |
| 3,793,256 | 2/1974 | Scoggin | 525/537 |
| 3,839,301 | 10/1974 | Scoggins | 525/537 |
| 4,274,993 | 6/1981 | Narisawa et al. | 525/537 |
| 4,370,471 | 1/1983 | Salmon | 528/388 |
| 4,383,080 | 5/1983 | Dupree | 528/388 |

FOREIGN PATENT DOCUMENTS 0309916  4/1989  European Pat. Off. .

OTHER PUBLICATIONS

Journal of Applied Polymer Science, vol. 39, pp. 1399–1415.
Japanese Patent Public Disclosure, KOKAI, No. 3-41152.

*Primary Examiner*—Melvyn I. Marquis
*Assistant Examiner*—Helen F. Lee
*Attorney, Agent, or Firm*—Sughrue, Mion, Zinn, Macpeak & Seas

[57] ABSTRACT

Brittleness of polyphenylene sulfide resins is significantly reduced and contrariwise toughness thereof is remarkably enhanced by a two-stage process which comprises the steps of subjecting a polyphenylene sulfide resin as synthesized to a thermal treatment under an inert atmosphere at a temperature above 200° C. so as to give a substantially linearly grown polyphenylene sulfide resin having an increased melt viscosity of not less than 800 poises, and then curing the substantially linear resin by heating it under an oxidative atmosphere at a temperature above 200° C. so as to produce a polyphenylene sulfide resin having a still more increased melt viscosity of not less than 5,000 poises.

7 Claims, No Drawings

PROCESS FOR PREPARING POLYPHENYLENE SULFIDE RESINS

BACKGROUND OF THE INVENTION

1. Field of the Invention

This invention relates to a process for preparing polyphenylene sulfide resins improved in regard to their well-known disadvantageous brittleness properties.

Because of their excellent heat resistance and chemical resistance properties, polyphenylene sulfide resins have drawn a good deal of attention as materials for preparing electrical and electronic parts, automotive parts and the like.

Further the resins are moldable or shapable into various articles such as parts, films, fibers, etc. by means of, for example, injection molding and extrusion molding techniques and have been employed in a variety of fields where their heat resistance and chemical resistance properties are desired or favored.

2. Prior Art

One of the typical processes for producing polyphenylene sulfide resins is disclosed in Japanese Patent Publication (KOKOKU) SHO 45-3368, which comprises reacting a dihalo-aromatic compound with an alkali metal sulfide, such as sodium sulfide, in an organic amide solvent, such as N-methyl-2-pyrrolidone. However, the product polyphenylene sulfide resins as prepared by this type of processes have such a low level of molecular weights that the resins as prepared are not directly employable in molding and shaping applications, such as injection molding. Therefore, the low molecular weight polymers have had to be modified to increase their molecular weights prior to their use in molding or shaping applications. Such modification can be effected, for example, by heating a low molecular weight material in air so as to crosslink the molecules and thereby to increase the molecular weight. However, the polymers increased in the molecular weight by this technique generally exhibit poor toughness properties.

As another approach, there have been proposed processes in which polyphenylene sulfide resins of increased molecular weights are directly prepared by polymerization reaction. Typical examples of the processes include a process in which the polyphenylene sulfide synthesis polymerization is effected in the presence of a polymerization assistant agent RCOOM, where R is a hydrocarbyl group and M is an alkali metal, as described in Japanese Patent Publication (KOKOKU) SHO 52-12240, and a process in which the polyphenylene sulfide synthesis polymerization is carried out in the presence of a specified proportion of water, as disclosed in Japanese Patent Public Disclosure (KOKAI) SHO 61-7332.

The processes based on these synthetic techniques appear to give polyphenylene sulfide resins having molecular weights higher than those achieved by the above-mentioned process of Japanese Patent Publication (KOKOKU) SHO 45-3368. The processes, however, have failed to render the product resins satisfactorily tough. Furthermore the processes can be put in practice only with a very low level of productivities.

SUMMARY OF THE INVENTION

An object of the present invention is to provide a process for preparing polyphenylene sulfide resins improved in regard to their brittleness properties, by which properties the conventional polyphenylene sulfide resins have been annoyed as well recognized by ones skilled in the art.

Another object of the invention is to provide a resinous molding composition comprising an improved polyphenylene sulfide resin that is produced by the process according to the invention.

A further object of the invention is to provide polyphenylene sulfide resins exhibiting excellent toughness properties.

Accordingly, the present invention provides a process for preparing improved polyphenylene sulfide resins which comprises the steps of subjecting a polyphenylene sulfide resin as synthesized to a thermal treatment under an inert atmosphere at a temperature above 200° C. so as to give a substantially linearly grown polyphenylene sulfide resin having an increased melt viscosity of not less than 800 poises and then curing the substantially linear resin by heating it under an oxidative atmosphere at a temperature above 200° C. so as to produce a polyphenylene sulfide resin having a still more increased melt viscosity of not less than 5,000 poises.

DETAILED DESCRIPTION OF THE INVENTION

The invention will be described in more detail.

The polyphenylene sulfide resin materials that are to be fed to the first thermal treatment of the present process are not restricted to specific ones. For example, the resin material may be one that has been conventionally synthesized by polymerizing a dihalo aromatic compound, such as p-dichlorobenzene, with an alkali metal sulfide, such as sodium sulfide, in a polymerization solvent, e.g. N-methyl-2-pyrrolidone. Provided that the physical properties of the resulting polymer are not adversely affected, the synthesis polymerization may be effected in the presence of a comonomer or comonomers, such as 4,4'-dichlorobenzophenone, 4,4'-dichlorodiphenyl sulfone, 1,2,4-trichlorobenzene, etc., so as to give a copolymer, which is to be fed to the present process.

Further, the polymer to be fed to the present process may be one that has been increased in the molecular weight by means of a polymerization assistant agent used during the synthesis polymerization.

In the present process, the polyphenylene sulfide resin feed material as above-synthesized is first thermally treated under an inert atmosphere at a temperature above 200° C. The inert atmosphere as referred to herein may comprise either any common inert gas or vacuum. Examples of the inert gases include nitrogen, helium, argon, carbon dioxide, steam, etc. The inert gases may contain such a low concentration of oxygen that oxidative crosslinking of the resin takes place to only a negligible extent during the first thermal treatment under the inert atmosphere. Thus, where the inert atmosphere has an oxygen content of less than 1% by volume, substantially no problem would occur.

The first treatment under the inert atmosphere is effected at a temperature above 200° C., preferably in the range of 200°–290° C., in particular in the range of 230°–265° C. If the treatment temperature is less than 200° C., any oligomeric products which have been entrained on the polyphenylene sulfide resin feed material and possibly cause side reactions to take place in the first and second treatment stages as well as any solvent, e.g. N-methyl-2-pyrrolidone, which has been also entrained on the feed material could be removed only at an unacceptably low efficiency. If the treatment temperature is above 290° C., it approaches or even exceeds the melting point of polyphenylene sulfide material and thus the operation of the treatment would become difficult due to the very viscous state of material at the excessively elevated temperatures.

The above-described treatment under the inert atmosphere should be effected to produce a substantially linearly grown polyphenylene sulfide resin having a melt viscosity of at least 800 poises as measured in a KOHKA type flow tester at 300° C. and 200 sec$^{-1}$ using an orifice of a 0.5 mm diameter and a 2 mm length. If the polyphenylene sulfide resin has a melt viscosity of less than 800 poises after the first treatment under inert atmosphere, a desirable improvement in the toughness properties could not be achieved. The resin, after the first treatment, should preferably have a melt viscosity of greater than 1,000 poises.

The final polyphenylene sulfide resin products that are contemplated in the present invention are obtained by curing, under an oxidative atmosphere, the substantially linear polyphenylene sulfide resins resulting from the first treatment.

This curing is effected by heating the substantially linear resin under an oxidative atmosphere at a temperature of at least 200° C., preferably in the range of 200°-290° C., in particular in the range of 230°-265° C. If the curing temperature is less than 200° C., then the curing reaction could proceed at an unacceptably low rate and an unpractically extended period of time would be required to achieve a desirably increased melt viscosity. If the curing temperature employed is in excess of 290° C., then the excessively high temperature may cause the polymer to degrade or decompose.

The term "oxidative atmosphere" as used herein means an atmosphere containing at least 1% by volume of oxidative gas or gases. Examples of the oxidative gases include oxygen, ozone, etc. For economical reasons, an oxygen-containing oxidative atmosphere, typically air itself or suitably enriched or diluted air atmosphere is preferably used in the invention.

Upon completion of the second oxidative curing step of the present process, the polyphenylene sulfide resin should have a melt viscosity of at least 5,000 poises, preferably at least 10,000 poises. If the cured resin has a final melt viscosity of less than 5,000 poises, then the improvement in the toughness of resin could be accomplished only to an unacceptably poor extent.

The polyphenylene sulfide resins that have been modified in accordance with the present process may be incorporated, if desired, with fibrous or particulate reinforcing agents in a proportion of not greater than 300 parts per 100 parts of the resin on the base of weight. Usually the reinforcing agents are incorporated in a proportion of from 10 to 300 parts by weight to improve the physical properties, such as strength, rigidity, heat resistance and dimension stability, of the modified polyphenylene sulfide resins.

Examples of the fibrous reinforcing agents which may be mentioned include carbon fiber and inorganic fibers, such as fibers of glass, silicon glass, alumina, silicon carbide, ceramics, asbestos, metals, etc.

Examples of the particulate reinforcing agents which may be mentioned include aluminas, silicate salts, such as wallastonite, sericite, kaolin, mica, clay, bentonite, asbestos, talc and alumina silicate; metal oxides, such as magnesia, zirconia and titania; carbonate salts such as calcium carbonate, magnesium carbonate and dolomite; sulfate salts, such as calcium sulfate and barium sulfate; glass beads, boron carbide, silicon carbide and silica. The reinforcing agents may be porous. The reinforcing agents may be used singly or in any suitable combination thereof. The reinforcing agents may be treated, if desired, with a coupling agent, such as a silane coupling agent or a titanium-based coupling agent, prior to incorporation into the resin.

The modified polyphenylene sulfide resins of the invention may be used with being blended with one or more other resins, such as polycarbonates, polyphenylene oxides, polysulfones, polyacetals, polyimides, polyamides, polyesters, polystyrene, ABS, polyolefins and the like.

The invention will be further described with reference to the following non-limiting Examples which are provided for illustration purpose.

In the Examples, the melt viscosity was determined in a KOHKA type flow tester at 300° C. and 200 sec$^{-1}$ using an orifice of a 0.5 mm diameter and a 2 mm length.

PREPARATION 1

Polymer Synthesis Followed by the First Thermal Treatment in an Inert Gas

A 15 liter-capacity autoclave was charged with 5 liters of N-methyl-2-pyrrolidone (referred to as NMP hereinafter) and heated to a temperature of 120° C. To the heated autoclave 1,873 g of $Na_2S.2.8H_2O$ and 330 g of lithium acetate were added. Then, the mixture was slowly heated with stirring over a period of about 2 hours to distill 415 g of water out the autoclave. After cooling the reactor system down to 140° C., 2,110 g of -p-dichlorobenzene was added. After sealing, the mixture was heated to 225° C. and allowed to polymerize for 3 hours at this temperature. Subsequently the temperature of the mixture was raised to 250° C. and the polymerization was permitted to proceed for a further 3 hours. A polyphenylene sulfide resin having a melt viscosity of 2,200 poises was obtained.

The resulting polymer was introduced into a 5 liter-capacity ribbon blender and agitated under a nitrogen atmosphere at room temperature for 12 hours and at 250° C. for 5 hours. With this treatment under nitrogen, the melt viscosity of the polymer was increased to 2,800 poises.

PREPARATION 2

A 15 liter-capacity autoclave was charged with 5 liters of NMP and heated to 120° C. To the heated autoclave, 1,873 g of $Na_2S.2.8H_2O$ was added. Then the mixture was slowly heated with stirring over a period of about 2 hours to distill 416 g of water out the autoclave. After cooling the reactor system down to 140° C., 2,110 g of p-dichlorobenzene was added. After sealing, the mixture was heated to 225° C. and allowed to polymerize for 2 hours at this temperature. Subsequently the temperature of the mixture was raised to 250° C. and the polymerization was permitted to proceed for a further 3 hours. A polyphenylene sulfide resin having a melt viscosity of 720 poises was obtained.

The resulting polymer was introduced into a 5 liter-capacity ribbon blender and agitated under a nitrogen atmosphere at room temperature for 12 hours and subsequently at 250° C. for a further 5 hours to increase the melt viscosity of the polymer to 980 poises.

PREPARATION 3

Polymer Synthesis not Followed by the First Thermal Treatment in an Inert Gas A 15 liter-capacity autoclave was charged with 15 liters of NMP and heated to 120° C. To the heated autoclave, 1,873 g of $Na_2S.2.8H_2O$ was added. Then the mixture was slowly heated with stirring for a period of about 2 hours to distill 416 g of water out the autoclave. After cooling the reactor system down to 140° C., 2,110 g of p-dichlorobenzene was added. After sealing, the mixture was heated to 250° C. and allowed to polymerize for 5 hours so as to give a polyphenylene sulfide resin having a melt viscosity of 370 poises.

EXAMPLE 1

The Second Oxidative Treatment

The polyphenylene sulfide resin from the above Preparation 1 was introduced into a 5 liter-capacity ribbon blender and agitated under an air atmosphere at 250° C. for 4 hours so as to cure the resin to such an extent that the resin had a melt viscosity of 7,500 poises.

The resulting polymer was extruded through a twin screw extruder at 300° C. into continuous strands which were cut to give pellets.

The pellets were injection molded to form test specimens for determining the physical properties. The injection molding machine was operated at a cylinder temperature of 300° C., an injection pressure of 800 kg/cm$^2$ and at a mold temperature of 145° C.

The specimens were used to determine the tensile elongation and strength in accordance with the test method of ASTM D-638, and the reverse-notched Izod impact strength in accordance with the test method of ASTM D-256. The results are set forth in Table 1.

EXAMPLE 2

In this example, the polyphenylene sulfide resin from the above Preparation 1 was used and the curing procedure of Example 1 was repeated except that the curing time was extended to 6 hours. The thus treated polyphenylene sulfide resin had a melt viscosity of 23,000 poises.

The test specimens were prepared by injection molding as in Example 1 except that the cylinder temperature was set at 320° C. and the injection pressure was at 1,200 kg/cm$^2$. The physical properties of the polymer were determined as in Example 1. The results are set forth in Table 1.

EXAMPLE 3

In this example, the polyphenylene sulfide resin from Preparation 1 was used and the curing procedure of Example 1 was repeated except that the curing time was extended to 8 hours. The thus treated polyphenylene sulfide resin had a melt viscosity of 32,000 poises.

The test specimens were prepared by injection molding as in Example 1 except that the cylinder temperature was set at 340° C. and the injection pressure was at 1,200 kg/cm$^2$. The physical properties of the polymer were determined as in Example 1. The results are set forth in Table 1.

EXAMPLE 4

In this example, the polyphenylene sulfide resin from Preparation 2 was used and the curing procedure of Example 1 was repeated except that the curing time was extended to 6 hours. The thus treated polyphenylene sulfide resin had a melt viscosity of 9,000 poises.

As in Example 1, the physical properties of the polymer were determined. The results are set forth in Table 1.

EXAMPLE 5

In this example, the polyphenylene sulfide resin from Preparation 2 was used and the curing procedure of Example 1 was repeated except that the curing time was extended to 10 hours. The thus treated polyphenylene sulfide resin had a melt viscosity of 21,000 poises.

As in Example 2, the physical properties of the polymer were determined. The results are set forth in Table 1.

COMPARATIVE EXAMPLE 1

In this example, the polyphenylene sulfide resin from Preparation 1 was used. The resin was not subjected to any further curing treatment under an air atmosphere, but was directly subjected to the preparation of test specimens and the determination of physical properties as described in Example 1. The results are set forth in Table 1.

COMPARATIVE EXAMPLE 2

The polyphenylene sulfide resin from Preparation 3 was used in this example. The resin was subjected to the curing procedure of Example 1 except that a curing time of 9 hours was employed. The thus treated resin had a melt viscosity of 8,100 poises.

The physical properties of the polymer were determined as in Example 1. The results are set forth in Table 1.

COMPARATIVE EXAMPLE 3

The polyphenylene sulfide resin from Preparation 3 was used in this example. The resin was subjected to the curing procedure of Example 1 except that a curing time of 13 hours was employed. The thus treated resin had a melt viscosity of 18,000 poises.

The physical properties of the polymer were determined as in Example 2. The results are set forth in Table 1.

As clearly shown by these results, the physical properties, in particular the toughness, of the polyphenylene sulfide resins are remarkably improved according to the invention. Therefore, the brittleness that has been a serious drawback of polyphenylene sulfide resin has been significantly reduced according to the invention. The invention, thus, has added a further value to the polyphenylene sulfide resins.

TABLE 1

|  | Melt viscosity before oxidative curing Poises | Melt viscosity after oxidative curing Poises | Tensile elongation % | Tensile strength kg/cm$^2$ | Izod impact strength-reverse-notched kg · cm/cm |
|---|---|---|---|---|---|
| Example 1 | 2800 | 7500 | 6.2 | 820 | 43 |
| Example 2 | 2800 | 23000 | 11.2 | 800 | not ruptured |
| Example 3 | 2800 | 32000 | 22.1 | 790 | not ruptured |
| Example 4 | 980 | 9000 | 4.4 | 810 | 30 |

TABLE 1-continued

|  | Melt viscosity before oxidative curing Poises | Melt viscosity after oxidative curing Poises | Tensile elongation % | Tensile strength kg/cm² | Izod impact strength-reverse-notched kg · cm/cm |
|---|---|---|---|---|---|
| Example 5 | 980 | 21000 | 10.8 | 820 | not ruptured |
| Comp. Ex. 1 | 2800 |  | 3.7 | 810 | 20 |
| Comp. Ex. 2 | 370 | 8100 | 2.7 | 610 | 15 |
| Comp. Ex. 3 | 370 | 18000 | 2.8 | 590 | 17 |

What is claimed is:

1. A process for preparing improved polyphenylene sulfide resin which comprises the steps of subjecting a polyphenylene sulfide resin as synthesized to a thermal treatment under an inert atmosphere at a temperature above 200° C. so as to give a substantially linearly grown polyphenylene sulfide resin having an increased melt viscosity of not less than 800 poises and then curing the substantially linear resin by heating it under an oxidative atmosphere at a temperature above 200° C. so as to produce a polyphenylene sulfide resin having a still more increased melt viscosity of not less than 5,000 poises.

2. A process according to claim 1 wherein the first thermal treatment and the second curing step are both effected at temperatures in the range of from 200° to 290° C.

3. A process according to claim 2 wherein the temperatures are in the range of from 230° to 265° C.

4. A process according to claim 1 wherein the inert atmosphere comprises vacuum or an inert gas and contains less than 1% by volume of oxygen.

5. A process according to claim 4 wherein the inert gas is selected from the group consisting of nitrogen, helium, argon, carbon dioxide and steam.

6. A process according to claim 1 wherein the resin has a melt viscosity of greater than 1,000 poises after the first thermal treatment but before the second curing step.

7. A process according to claim 1 wherein finally the resin has a melt viscosity of greater than 10,000 poises.

* * * * *